United States Patent [19]

Lee

[11] Patent Number: 5,060,143
[45] Date of Patent: Oct. 22, 1991

[54] SYSTEM FOR STRING SEARCHING INCLUDING PARALLEL COMPARISON OF CANDIDATE DATA BLOCK-BY-BLOCK

[75] Inventor: Kuo-Chu Lee, Franklin Township, Somerset County, N.J.

[73] Assignee: Bell Communications Research, Inc., Livingston, N.J.

[21] Appl. No.: 230,483

[22] Filed: Aug. 10, 1988

[51] Int. Cl.$^5$ .................... G06F 7/06; G06F 7/20; G06F 15/40

[52] U.S. Cl. ................ 364/200; 364/282.1; 364/283.1; 364/253.1; 364/254.3; 364/259.2; 364/947.2; 364/956.1; 364/957.1; 364/974; 364/974.6; 340/146.2

[58] Field of Search ... 364/200 MS File, 900 MS File; 340/146.2

[56] References Cited

U.S. PATENT DOCUMENTS

| | | | |
|---|---|---|---|
| 3,970,993 | 7/1976 | Finnila | 364/200 |
| 4,450,520 | 5/1984 | Hollaar et al. | 364/200 |
| 4,490,811 | 12/1984 | Yianilos et al. | 364/900 |
| 4,550,436 | 10/1985 | Freeman et al. | 382/34 |
| 4,625,295 | 11/1986 | Skinner | 364/900 |
| 4,760,523 | 7/1988 | Yu et al. | 364/200 |
| 4,876,643 | 10/1989 | McNeill et al. | 364/200 |
| 4,899,128 | 2/1990 | Shapiro | 340/146.2 |

OTHER PUBLICATIONS

"ALTEP—A Cellular Processor for High-Speed Pattern Matching", New Generation Computing, 4 (1986), pp. 225-244.

"Realization of Efficient Non-Numeric Operations Through VLSI", Proceedings of VLSI '83, 1983, T. Curry et al.

"The Design of Special Purpose Chips", Computer Magazine, 13 (1): 26-40, M. J. Foster et al., Jan. 1980.

"Operational Characteristics of a Hardware-Based Pattern Matcher", ACM Transactions on Database Systems, R. L. Haskin et al., Mar. 1983, vol. 8, No. 1, pp. 15-40.

Primary Examiner—Thomas C. Lee
Assistant Examiner—Ayni Mohamed
Attorney, Agent, or Firm—James W. Falk; Leonard Charles Suchyta

[57] ABSTRACT

A highly efficient string search algorithm and circuit are disclosed. The string search algorithm utilizes candidate-data-parallel, target data serial comparisons along with an early mismatch detection mechanism to locate a target in a candidate data base in a highly efficient manner.

5 Claims, 3 Drawing Sheets

SYSTEM FOR STRING SEARCHING INCLUDING PARALLEL COMPARISON OF CANDIDATE DATA BLOCK-BY-BLOCK

FIELD OF THE INVENTION

The present invention relates to an algorithm for reducing the time required to search large data bases, and more particularly to a data base searching technique known as string searching.

BACKGROUND OF THE INVENTION

The problem of string searching is to identify the appearance of an r-character target vector $P[i]$ where $i = 1, 2, \ldots r$ constructed from a vocabulary of m distinct characters anywhere in an n-character candidate data base $S[j]$, where $j = 1, 2, 3, \ldots n$. For typical applications $r << n$ and $m << n$. Each of the characters comprising $P[i]$ and $S[j]$ is an alphanumeric character or grammatical symbol etc. A typical example of a string search might be to find the target vector "filters" in a candidate data base represented by a bit stream of the form "xxxxfile, filtersxxxx."

A variety of different software and hardware algorithm for searching large data bases have been proposed. (See e.g. Curry, T. and Mukhopadhyay, A., "Realization of Efficient Non-Numeric Operations Through VLSI," Proceedings of VLSI '83, 1983; Foster, M. J. and Kung, H. T., "The Design of Special Purpose Chips", Computer Magazine 13(1): 26–40, January, 1980; Haskin, R. L. and Hollaar, Lee A., "Operational Characteristics of a Hardware-Based Pattern Matcher," ACM Transactions on Database Systems, Vol. 8, No. 1, March 1983, pages 15–40; Mead, C. A., Pashley, Richard D., Britton, Lee D. Daimon, Yoshiaki T., and Sando, Jr. Steward F., "128-Bit Multicomparator", IEEE Journal of Solid-Stated Circuits, Vol. SC-11, No. 5, October 1976; Pramanik, Sakti, "Performance Analysis of a Database Filter Search Hardware", IEEE Transaction on Computers, Vol. C-35, No. 12, December 1986; Takahashi, K., Yamada, H., Nagai, H., and Hirata, M., "Intelligent String Search Processor Accelerate Text Information Retrieval," 5th International Workshop on Database Machines, Tokyo, Japan, 1987, page 440–453).

The search speeds of these existing algorithms are limited because the characters in the data base to be searched are examined sequentially. For example, in the Curry et al. reference identified above, the target vector $P[i]$, $i = 1, 2, 3 \ldots r$, is loaded into array of r comparators and the bytes in the candidate data base are shifted or broadcast sequentially through the comparator array in a pipelined fashion. Such an approach to string searching is throughput limited by the propagation delay of each stage in the pipeline, which is in turn limited by the comparison rate of the individual comparators. Existing comparator array approaches to string searching also require that every byte or character in $S[j]$ be tested against every byte or character in $P[i]$ even if the result of a comparison is redundant with previous comparisons. For example if $P[i=1]$ does not equal $S[j=1]$, then the comparison of $P[i=2]$ with $S[j=2]$ is unnecessary since a string in the data base $S[j], j = 1, \ldots n$, matching $P[i]$, $i = 1, 2, \ldots r$, $r << n$, cannot begin at $S[j=1]$. Thus, existing comparator array approaches make poor use of comparator resources.

In view of the above, it is an object of the present invention to provide a parallel algorithm for searching data bases with an improved comparison efficiency. More particularly, it is an object of the present invention to provide a string search algorithm for searching data bases that makes better use of comparator resources than prior string search algorithms.

SUMMARY OF THE INVENTION

The present invention is a string search algorithm which utilizes target-data-serial, candidate-data-parallel comparisons in conjunction with an early mismatch detection mechanism to dramatically improve the throughput achievable for string searching.

The string search algorithm of the present invention operates on the candidate data base on a block-by-block basis. This is in contrast to prior art string search algorithms which operate on the candidate data base one byte (i.e. one character) at a time. More particularly, in accordance with the present invention, a block of N characters from the candidate data base stream $S[j]$ is loaded in parallel into a comparator array where N is the size of the comparator array. A character from the target vector $P[i]$ is simultaneously loaded into all the comparators in comparator array on a demand driven basis based on the results of comparisons involving the previously loaded character from $P[i]$. Thus, a character from the target pattern is compared in parallel with all of the characters of the block of the candidate data base currently in the comparator array. Depending on the results of this comparison, the next character in the target vector is or is not loaded into all the comparators in the comparator array. Hence, the term "target-data-serial, candidate-data-parallel" comparison. A match of $P[i=1]$ with a character $S[j=a]$ from the current block of the candidate data stream indicates the start of a match trace and will trigger the loading of the next character $P[i=2]$ from the target vector into the comparator array. If $P[i=2]$ matches $S[j=a+1]$, the match trace continues and the third character from the target vector $P[i=3]$ is loaded into the comparator array.

A mechanism is provided to keep track of partial match traces which involved the last character in a block from the data base. For example, such a partial match trace arises if there is a match between the first two characters of the target vector and the last two characters in the current block of the candidate data base. The string search algorithm of the present invention determines if such partial match traces continue across the boundary between adjacent blocks from the candidate data base.

If, after a comparison between the current block of characters from the candidate data base and a particular character from the target vector, all the comparison results are zero, and there is no indication of a partial match trace generated from the previous block of the candidate data base which might continue in the current block of the candidate data base as a result of a match between the first character of the current block and a subsequent target character, an early out flag will be set. The early out flag indicates that further comparisons between the current block of candidate data and subsequent target vector characters cannot possibly result in identification of the target. On detection of the early out flag, the next block of characters from the candidate data base stream will be loaded into the comparator array and the search algorithm is restarted from the first character of the target vector. This early out mechanism substantially reduces redundant comparisons and enables the string search algorithm of the present invention to be highly efficient.

If there is a partial match trace involving the last character of the previous block from the candidate data base, then the fact a particular character from the target vector fails to match with any character in the current block of the candidate data base will not necessarily lead to the setting of an early out flag. For example, if the first two characters of the target vector match the last two characters of the previous block of candidate characters, an early out flag is not generated until the third character of the target vector is tested against the current block of candidate characters. Thus, even if the first two target vector characters produce no matches with the current block of candidate characters no early out flag is generated as it is still possible that the third character of the target vector will match with the first character of the current block and the match trace will continue across the boundary between the previous and current blocks.

A HIT indicating that the target has been found in the data base is generated when the last character in the target is identified as being part of a match trace.

The string search algorithm of the present invention has several important advantages not found in previous string search algorithms. First, as indicated above, the early mismatch detection capability reduces redundant comparisons, increasing throughput significantly. The throughput achieved by the inventive data parallel string search algorithm reduces the need for expensive high speed GaAs or ECL devices in a circuit implementation. The algorithm catches all occurrences of partial matches so that no backup mechanism is required. In addition, the performance and hardware utilization of the algorithm is not dependent on the length of the target vector. While the algorithm of the present invention is primarily intended to perform string searching at ultra-high speed, the algorithm may also be used to handle more complicated search queries.

DETAILED DESCRIPTION

The present invention is string search algorithm which can be used to search large data bases. The detailed description of this algorithm is divided into three sections. The first section below explains the operation of the algorithm with reference to a particular example. The second section comprises a more formal statement of the algorithm and the third section describes a circuit implementation of the algorithm.

A. EXAMPLE OF THE INVENTIVE STRING SEARCH ALGORITHM

Figure 1:
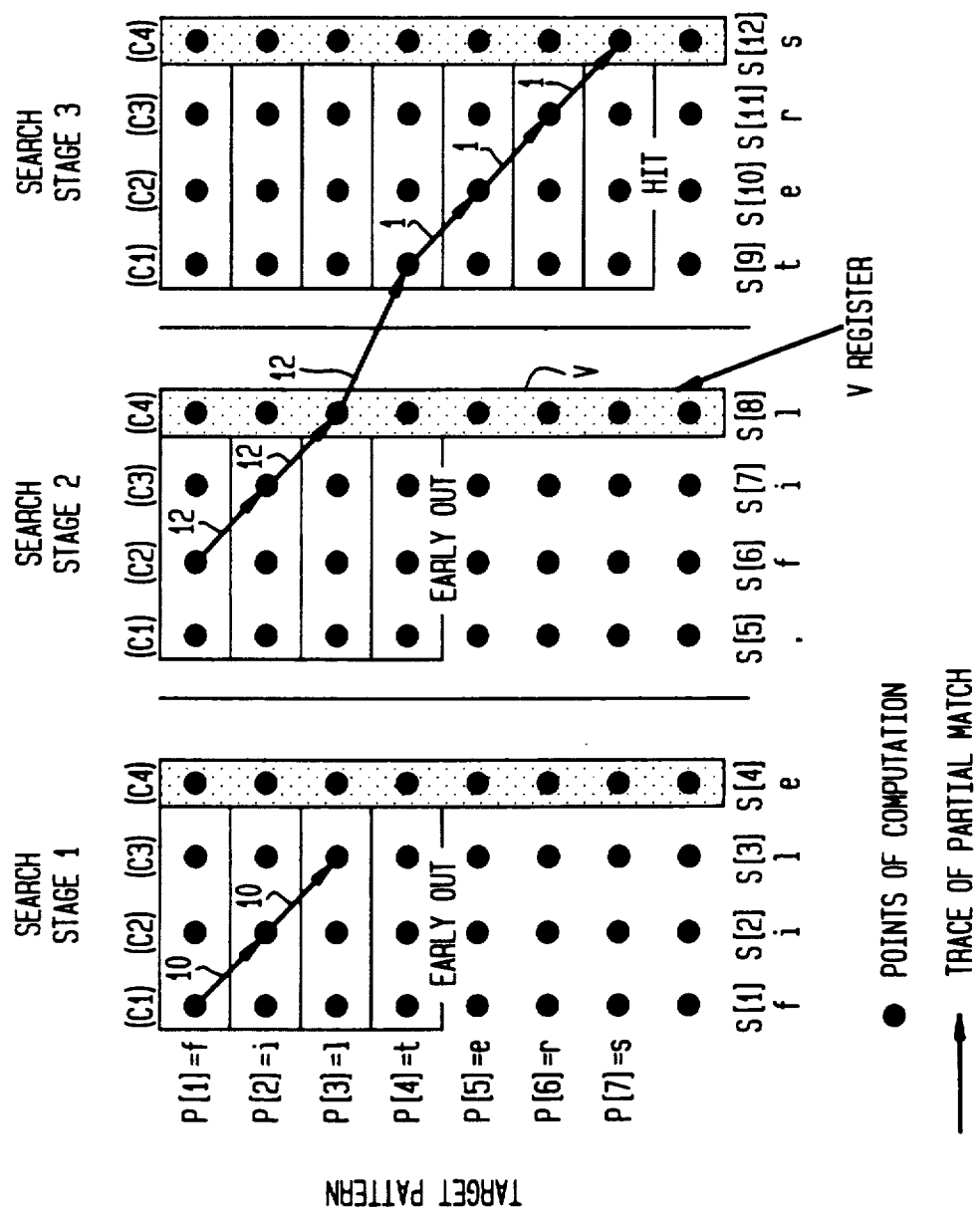
FIG. 1 illustrates the carrying out of a string search algorithm in accordance with an illustrative embodiment of the present invention.

The string search algorithm of the present invention may, for example, be used to find the target vector "filters" in a candidate data base stream of the form "xxxxfile, filtersxxxx". Thus the target vector P[i] is "filters". Accordingly, as shown on the left-hand side of FIG. 1, P[i]=f, P[2]=i, ... P[7]=s. Similarly as shown at the bottom of FIG. 1, S[1]=f, S[2]=i, ... S[5]=, S[6]=f ... S[11]=r, S[12]=s. Each of the dots in FIG. 1 represents a point of comparison, i.e. a point where a comparison may take place between a character in the target pattern and a character in the candidate data base. The arrows represent sequences of character matches which form traces of partial or complete matches.

In this example, the string search algorithm of the present invention is carried out using a comparator array that is four bytes or characters long. The comparators are designed C[1], C[2], C[3], C[4].

In accordance with the inventive algorithm, in search stage I of the string search algorithm, the first block of four characters from the candidate data base stream (i.e. file) is loaded into the comparator array. All of the characters in "file" are compared in parallel with the first character from the target pattern, i.e. P[1]=f. This set of four comparisons is represented by the first row of dots in search stage 1 of FIG. 1. Since P[1]=f matches with S[1]=f, the character P[2]=i is entered into the comparator array and all the characters in "file" are compared in parallel with P[2]=i. This next set of four comparisons is represented by the second row of comparison points in search stage I. Since S[1]=f matches with P[1]=f and S[2]=i matches with P[2]=i the partial match trace symbolized by the arrows 10 is initiated. Since S[3]=1 matches P[3]=1, the partial match trace 10 continues through the third row of comparison points in search stage I.

The process continues until P[4]=t is loaded in the comparator array. P[4]=t is compared in parallel with all the characters in "file" and no match is indicated (see the fourth row of comparison points of search stage I in FIG. 1). An early out flag is then set because no further comparison involving the first block of the candidate data base stream will produce any useful results as P[4]=t is nowhere to be found in the first block of the candidate data base. This completes search stage I as shown in FIG. 1.

In search stage II of the string search algorithm of the present invention, the next block of candidate text is loaded in the comparator array. This block of text is ",fil". The characters from the target vector are fed one after the other into the comparator array depending on the comparison results involving the previous character from the target pattern. Thus, as shown in search stage II of FIG. 1, a partial match trace 12 is generated as the characters P[1]=f, P[2]=i, P[3]=1, match with the characters S[6]=f, S[7]=i, S[8]=1, respectively.

Note that the shaded comparison points on the right-hand side of the comparator array (i.e. at the comparator C(4)) represent a register "V" which can temporarily store partial match trace results, which results will be needed to process the next block of the candidate data base. The register is used at the end of the search stage II in FIG. 1 because, at the end of this search stage, it is not yet known whether or not the partial match trace 12 crosses over the candidate data base block boundary between the second and third search stages. (The answer is not known until the fourth row of comparisons points is evaluated in the third search stage). Thus, an indication of the partial match trace 12 is stored in the third bit of the register "V" and this indication is used in the third search stage of FIG. 1.

It should be noted that the second search stage is not terminated at this point just because a partial match trace involves a comparator C[4] and an indication of a partial match trace is placed in the "V" register. Depending on the target vector and the current block from the candidate data base, there is always the possibility of other match traces involving subsequent target vector characters. A search stage is terminated only when a particular target character does not match any of the characters in the current block and there are no partial matches from the previous search stage which may possibly continue with a match between the first character from the current block and a subsequent target character. Accordingly, after P[3]=1 matches with S[8]=1 and an indication of a partial match is stored in the "V" register, the target character P[4]=t is loaded into the comparator array. The resulting set of comparisons is represented by the fourth line of dots in search stage II of FIG. 3. Since P[4]=t does not match with any characters in data base block of the second search stage and there are no partial match traces from the first search stage, an early out flag is generated to complete the second search stage.

In the third search stage the block "ters" of the candidate data base is loaded into the comparator array. The characters from the target vector are then fed one at a time to all the comparators for comparison in parallel with all the candidate characters presently in the comparator array. Although there are no match involving P[1]=f, P[2]=i, P[3]=1, an early out flag is not generated because of the partial match in the previous search stage and the indication thereof stored in the V register. Match indications are provided between P[4]=t, P[5]=e, P[6]=r, P[7]=s and S[9]=t, S[10]=e, S[11]=r, S[12]=s, respectively, so that when combined with the partial match of the previous search stage a hit flag is generated. In particular, since P[4]=t matches with S[9]=t, the partial match trace 12 crosses the boundary between the second and third match stages.

B. FORMAL REPRESENTATION OF THE ALGORITHM

The string search algorithm of the present invention is now described in a more formal representation.

Assume a comparator array comprising N comparators C[k], k=1, 2... N. Each comparator compares two bytes. One byte is a character from the target vector and the other byte is a character from a block of the candidate data base. Each comparator will generate a comparison result $R^q[i,k]$, where q, q=1, 2,..., denotes the search stage (i.e. the particular block from the candidate data base), i is an index which denotes the number of the character in the target vector, and k denotes the position of the comparator in the comparator array. Thus, a value $R^q[i,k]$ is computed for each comparison point in FIG. 1.

The comparison function of each comparator may be represented as $R^q[i,k]$=EQ ($A^q[i,k]$, $B^q[i,k]$) where $R^q[i,k]=1$ if $A^q[i,k]=B^q[i,k]$ and $R^q[i,k]=0$ if $A^q[i,k]$ does not equal $B^q[i,k]$ where $A^q[i,k]$ and $B^q[i,k]$ k=1,2. ..N are the inputs to the comparators C[k] k=1,2... N, respectively. An early out flag, EROF, is defined to indicate that subsequent comparisons involving a particular block q of the candidate data are unnecessary because mismatching has occurred. It is also desirable to maintain an array $T^q[i,k]$ which records intermediate comparison results. A value $T^q[i,k]$ is computed for each comparison point in FIG. 1. More particularly, $T^q[i,k]$ is defined below to keep track of partial and complete match traces such as the match traces 10 and 12 of FIG. 1. It is also desirable to maintain a vector $V^q(j)$ where $V^q(o)=1$, $V^q(j)=T^q[J,N]$ for $o<j<r$. The vector $V^q(i)$ comprises values stored in the register V of FIG. 1 for the qth search stage and, accordingly, contains information identifying the position of the character in P[i], i=1,2, ..., r that, as part of a partial match trace, matches against the last (i.e., the Nth) character of the qth block of the candidate data base. The string search algorithm of the present invention performs the following operations.

1) Broadcast the ith character of the target pattern P[i], to all comparator inputs $B^q[i,k]$ k=1,2, ... N and the qth block of candidate text comprising N bytes into $A^q[i,k]$ k=1,2, ... N.

2) Compare $A^q[k]$ with B[i,k] for k=1,2, ... N and generate $R^q[i,k]$ k=1,2, ... N. In addition, $T^q[i,k]$ is evaluated as follows:

$$T^q[i,k] = R^q[i,k] \text{ AND } T^q[i-1,k-1] \text{ for } k=2\ldots N,$$
$$\text{and } T^q[i,k] = R^q[i,k] \text{ AND } V^{q-1}(i-1) \text{ for } k=1 \quad (1)$$

(Note, for the algorithm to operate properly, $V^q(i)$ and $T^q[i,k]$ are initialized by setting $V^q(o)=1$, $V^q(j)=0$ $o<j<r$ and $T^q[o,k]=1$ even though there is no target character corresponding to i=0.

Evaluate the early out flag according to the formula $$\overline{EROF} = T^q[i,1] \text{ OR } T^q[i,2] \text{ OR } \ldots \text{ OR } T^q[i,N] \text{ OR }$$
$$V^{q-1}(i) \text{ OR } V^{q-1}(i+1) \text{ OR } \ldots \text{ OR } V^{q-1}(r) \quad (2)$$

(This means that after the ith character of the target vector has been compared with the qth block of the candidate data base, if there are no comparisons generated which form part of a partial match trace, i.e. all $T^q[i,k]=0$ k=1, ... N, and there are no partial match traces from the (q−1)th search stage waiting for subsequent results from the qth search stage to determine if a partial match trace crosses a boundary, then an early out flag is set).

3) If EROF is set then the next N characters of the candidate data base are loaded into $A^{q+1}[k]$, k=1, ... N (i.e. the qth search stage is complete and the (q+1)th search stage is to begin.) Characters from the target pattern are loaded into $B^{q+1}[i,k]$ k=1,2, ... N starting with P[i=1] and the algorithm is performed starting from step 1 with i=1.

If EROF is not set (i.e. the qth search stage continues) then load p[i+1] into $B^q[i+1,k]$, k=1, ... N and repeat the algorithm starting from step 2.

When the character p[i=r] i.e. the last character in p[i], i=1,2, ... r) is being processed, it is necessary to check for a full match. A HIT flag, indicating a full match is set as follows:

$$HIT = T^q[i,k=1] \text{ OR } T^q[i,k=2] \text{ OR } \ldots \text{ OR }$$
$$T^q[i,k=N] \text{ AND } (i=r) \quad (3)$$

If the HIT flag is not set, the algorithm is executed until the end of the candidate text is reached.

An illustrative algorithm has been presented in which the basic information unit utilized by the algorithm is an eight bit wide byte/character and in which one such information unit is compared in parallel with a block of information units from a data base to be searched. However, in practice the information unit may be of any length. For instance, it is possible to use a sixteen bit word as the information unit. In this case, the data base to be searched is broken into blocks comprising N sixteen bit words and sixteen bit words from the target are compared in parallel with all of the sixteen bit words in the current block of the data base.

It is also possible for two or more target characters to be compared simultaneously against a block from the data base.

For example, if two rows of comparators are used then two characters will be compared against the input data block simultaneously. In this case additional intermediate values T will be generated by "ANDing" the current comparison results in R with $T^q[i-2, k-2]$. Also, a two bit V register $V^q(i)$ and $V^q(i+1)$, will be set according to the content of $T^q[i,N]$ and $T^q[i+1,N]$.

The algorithm of the present invention operators on a data base in a block by block fashion, sustains a very high data rate, and operates under single control. As a result, it is suitable to be integrated into a super computer as a high performance vectorized string search function unit.

C. HARDWARE IMPLEMENTATION OF THE STRING SEARCH ALGORITHM

Figure 2:
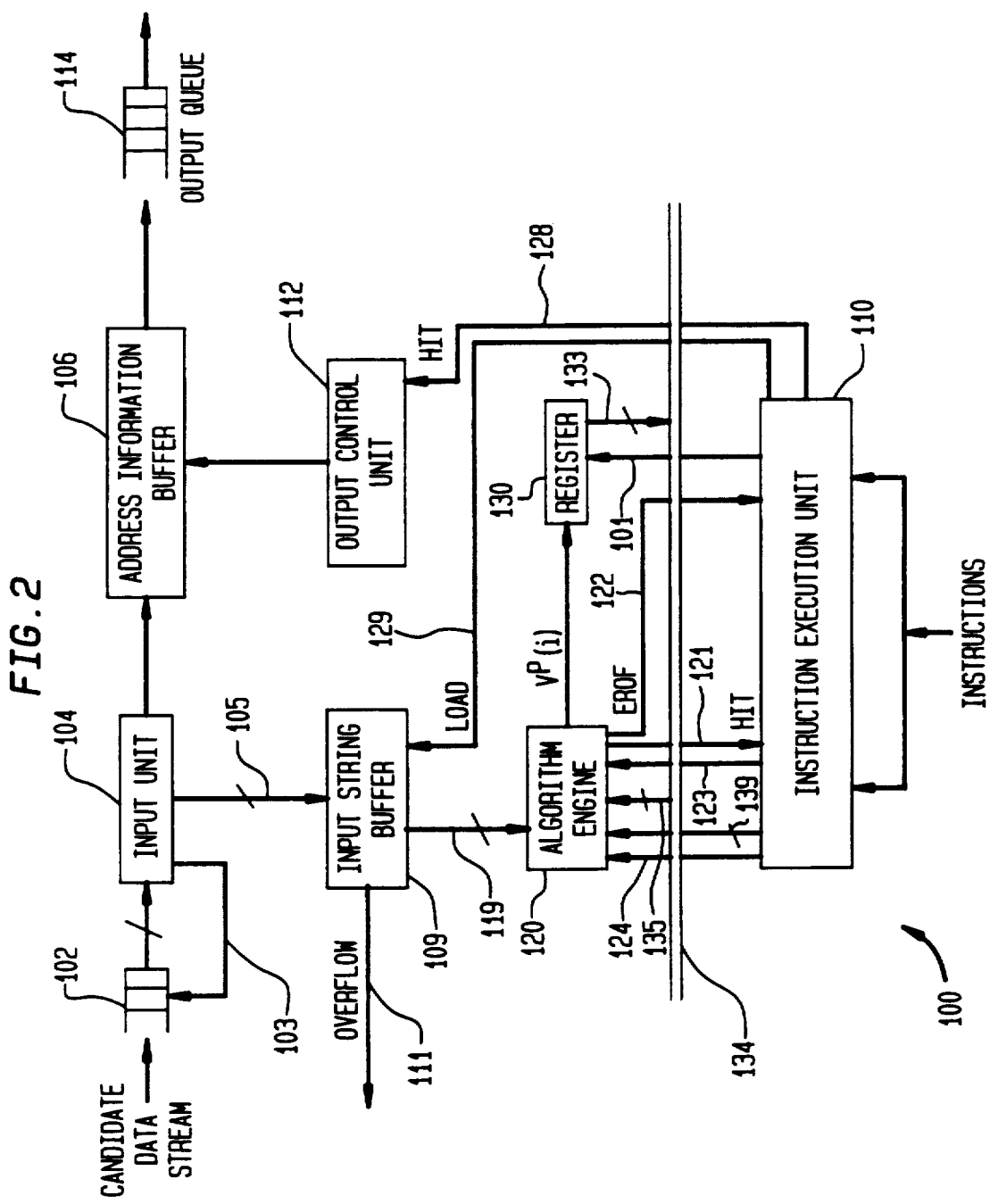
FIGS. 2 and 3 schematically illustrate a circuit implementation of a string search algorithm in accordance with an illustrative embodiment of the present invention.
Figure 3:
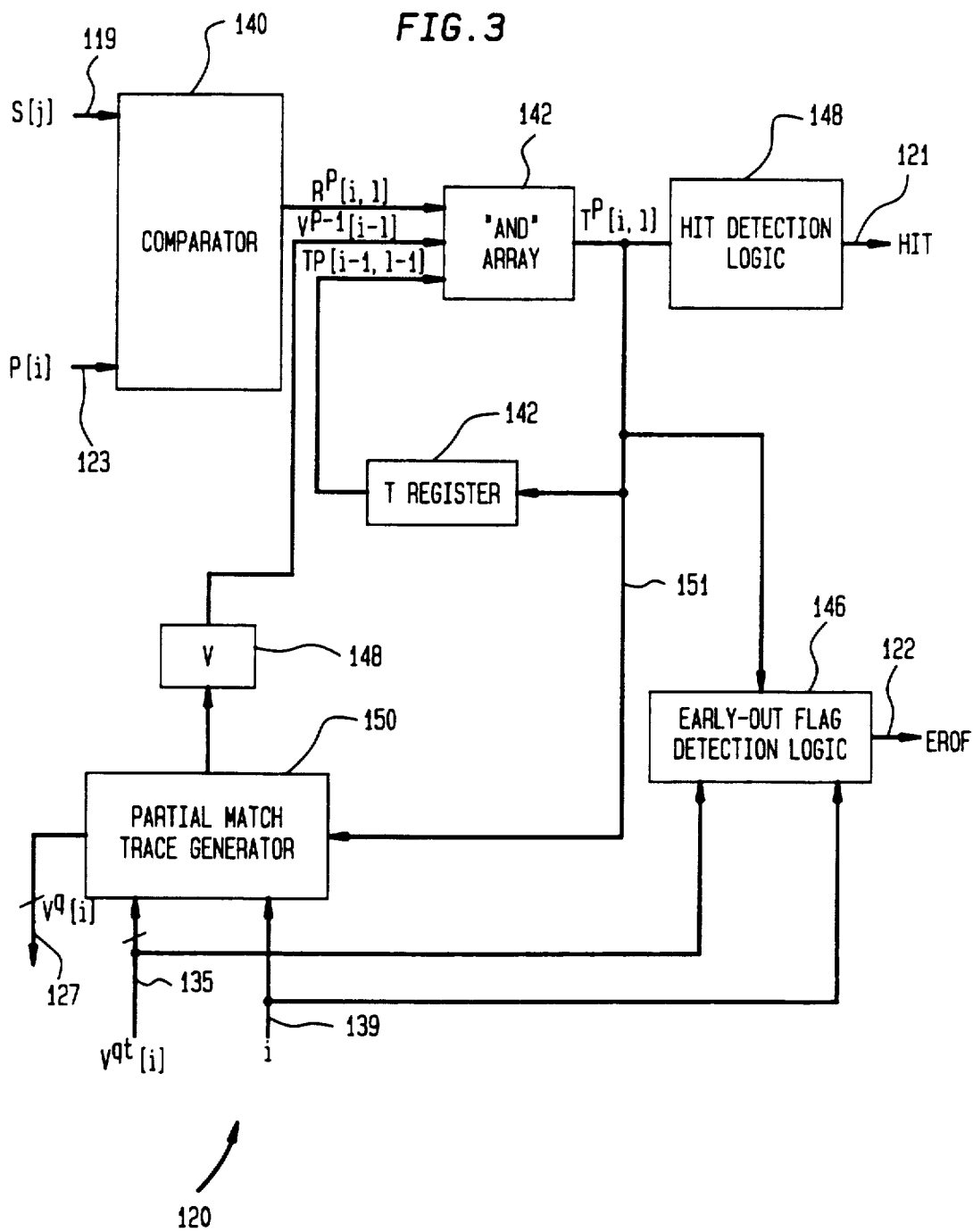

A hardware implementation of the string search algorithm is illustrated in FIGS. 2 and 3. More particular, FIG. 2 illustrates a processor architecture 100 for carrying out the string search algorithm of the present invention and FIG. 3 illustrates an algorithm engine 120 for calculating partial match status (i.e. $T^q[i,k]$) and the early out indication (i.e. EROF).

Turning to FIG. 2, the candidate data base stream arrives at the processor 100 via queue 102. An input unit 104 strips address information from the candidate data base stream. The address information is stored in address information buffer 106. Blocks of data from the candidate data stream are loaded in parallel via lines 105 into the input string buffer 109. Illustratively, the input string buffer 109 stores two blocks of candidate data. A signal on line 103 from input unit 104 to input queue 102 controls the flow of the candidate data into the input unit 104. An overflow line 111 is provided if blocks of candidate data arrive too fast at the input string buffer. The overflow signal may trigger a high level exception handler (not shown) to perform high level detail analysis on the part of the data base that causes the overflow. The instruction execution unit 110 receives user instructions (e.g. find "filters") and decodes these user instructions down into more basic instruction steps (e.g. find "f" in a particular block of candidate data).

The string search algorithm is carried out by the algorithm engine 120. Blocks of candidate data are loaded into the algorithm engine in parallel via line 119. The algorithm engine has access to both blocks of candidate data in the input string buffer because after a failed comparison with a character from the target vector a second block of candidate data may be needed immediately. Characters characters P[i] from the target vector are transmitted from the instruction execution unit 110 to the algorithm engine 120 via line 123 and control signals are transmitted to the algorithm engine via line 124. The value of the index i in a particular P[i] is transmitted to the algorithm engine via line 139.

The algorithm engine 120 compares in parallel the characters of a block of candidate data from the input string buffer with a character from the target vector received from the instruction execution unit. Depending on the results of a particular set of comparisons involving a character from a target vector, an early out flag (EROF) or a HIT flag may be generated by the algorithm engine. If a HIT flag is generated, it is transmitted to the instruction execution unit 110 via line 121. The instruction execution unit in turn sends a signal via line 128 to the output control unit 112 which in turn causes the address of the candidate data block resulting in the HIT flag to be transferred from the address information buffer 106 into the output queue 114. If an early out flag is generated, it is transmitted to the instruction execution unit 110 via line 122. This in turn causes a LOAD signal to be transmitted via line 129 from the instruction execution unit to the input string buffer 109 to cause a new block of the candidate data base to be transferred to the algorithm engine 120. If no early out flag appears after the comparison of one target vector character with the current block of candidate data, the instruction execution unit causes a new target vector character to be loaded into the algorithm engine.

At each search stage q, the algorithm engine 120 outputs the vector $V^q(i)$ via line 127 which is stored in the register 130. The register 130 receives control signals on line 131 from the instruction execution unit. The stored vector $V^q(i)$ is then transmitted back to the algorithm engine 120 via lines 133, and lines 135 for use in the q+1 search stage to calculate EROF and $T^{q+1}[i,k]$ The algorithm engine 120 is shown in greater detail in FIG. 3. In FIG. 3 control signals to or from the instruction execution unit 110 of FIG. 2 are omitted for purposes of clarity. The inputs to the algorithm engine are a block of candidate data on lines 119, a target vector character on line 123, the vector $V^{q-1}(i)$ on lines 135 and the value of the index i via lines 139.

The outputs of the algorithm engine 120 are the HIT flag on line 121, the EROF flag on line 122, and $V^q(i)$ on line 127.

As shown in FIG. 3, the block of characters from the candidate data base is compared in parallel with the characters from the target vector in comparator array 140. The comparator array 140 generates $R^q[i,k]$ for each target vector character P[i]. The values $T^q[i,k]$ are calculated using the AND array 142. For the $i^{th}$ character P[i] of the target vector, the inputs to the AND array 142 are $R^q[i,k]$ $T^q[i-1, k-1]$ and $V^{q-1}(i-1)$. The values $T^q[i-1,k-1]$ are stored in the register 147 and the values $V^{q-1}(i-1)$ are stored in the register 143 for use by the AND array 142. The $T^q[i-1,k-1]$ are in accordance with Eq. (1) above.

The early out detection logic 146 receives the inputs $T^q[i,k]$, $V^{q-1}(i)$, and i and generates the EROF on line 122 in accordance with Eq. (2) above. Similarly, the hit detection logic 148 receives as an input $T^q[i,k]$ and determines whether or not there is a hit in accordance with equation (3) above. The partial match trace generator 150 receives the vector $V^{q-1}(i)$ via line 135 and $T^q[i,k]$ via line 151 and outputs the values $V^q(i)$ to the register 130 of FIG. 2 via line 127.

D. CONCLUSION

A highly efficient string search algorithm has been disclosed. More particularly, the string search algorithm of the present invention utilizes candidate-data-parallel, target-data-serial comparisons, along with an early mismatch detection mechanism to minimize the number of unnecessary comparison operations and to insure a high throughput. Finally, the above-described embodiment of the invention are intended to be illustrative only. Numerous alternative embodiments may be devised by those skilled in the art, without departing from the spirit and scope of the following claims.

What is claimed is:

1. An electronic string search processor circuit for identifying a target pattern in a data base in the form of a string of characters, said circuit comprising:
   - a comparator array for comparing in parallel a current block of characters from said data base with a character from said target,
   - match trace processor means responsive to said comparator array for determining if said target character forms part of a match trace, said match trace processor means comprising a register for storing information identifying match traces including the last character of an immediately previous block from said data base, in order to determine when a match trace crosses the boundary between the previous block and the current block of said data base,
   - means for loading a new target character into said comparator array if said target character forms part of a match trace and it is not the last character of said target,
   - means for loading a new block from said data base into said comparator array if said target character does not form part of a match trace and there are no match traces including the last character of the previous block of said data base which can possibly be extended across said boundary into the current block by a subsequent character from said target, and
   - means for generating a hit signal for indicating the presence of said target in said data base when the last character of said target forms part of a match trace.

2. The circuit of claim 1 wherein said comparator array simultaneously compares in parallel two or more characters from said target with said current block of said data base.

3. A method for operating an electronic string search processor to identify a target pattern in a data base in the form of a string of characters, said method comprising the steps of
   - utilizing a comparator array forming part of said processor for comparing in parallel a current block of data base characters with a character from said target,
   - electronically providing information identifying match traces including the last character of an immediately previous block of characters from said data base,
   - electronically determining in response to said comparing step and in response to said providing step if said character from said target belongs to a match trace, said determining step including the step of determining whether said target character belongs to a match trace which crosses the boundary between said previous block and said current block of said data base,
   - loading a new target character into said comparator array if said target character forms part of a match trace and said target character is not the last target character,
   - loading a new block of said data base into said comparator array if said target character does not form part of a match trace and there are no match traces including the last character of the previous block of said data base which can possibly be extended across said boundary into the current block by a subsequent character from said target, and
   - electronically generating a hit signal for indicating the presence of said target in said data base when the last character of said target forms part of a match trace.

4. The method of claim 3 wherein said providing step comprises storing in a register said information identifying match traces including the last character of said previous block from said data base.

5. The method of claim 3 wherein said comparing step comprises comparing in parallel two or more characters from said target with the characters of the current block of said data base.

* * * * *